May 15, 1956 L. B. GREEN 2,745,121
APPARATUS FOR FORMING RING-SHAPED FASTENERS FROM FLAT STOCK
Original Filed Jan. 11, 1951 7 Sheets-Sheet 1

INVENTOR.
LEE B. GREEN
BY Hudson, Doughton,
Williams, David & Hoffmann
ATTORNEYS

INVENTOR.
LEE B. GREEN

May 15, 1956 L. B. GREEN 2,745,121
APPARATUS FOR FORMING RING-SHAPED FASTENERS FROM FLAT STOCK
Original Filed Jan. 11, 1951 7 Sheets-Sheet 3
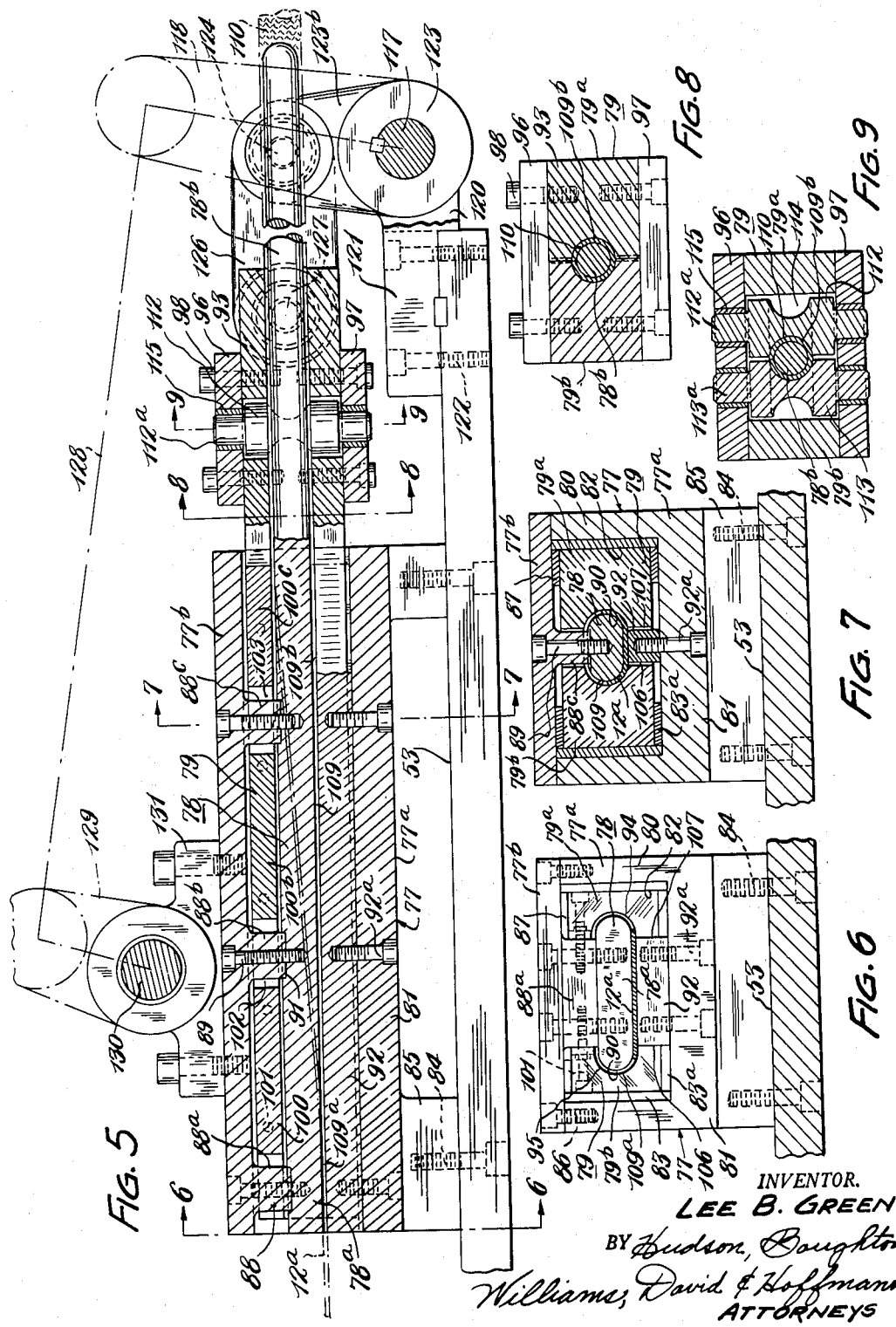
INVENTOR.
LEE B. GREEN
BY Hudson, Boughton,
Williams, David & Hoffmann
ATTORNEYS May 15, 1956 L. B. GREEN 2,745,121
APPARATUS FOR FORMING RING-SHAPED FASTENERS FROM FLAT STOCK
Original Filed Jan. 11, 1951 7 Sheets-Sheet 4
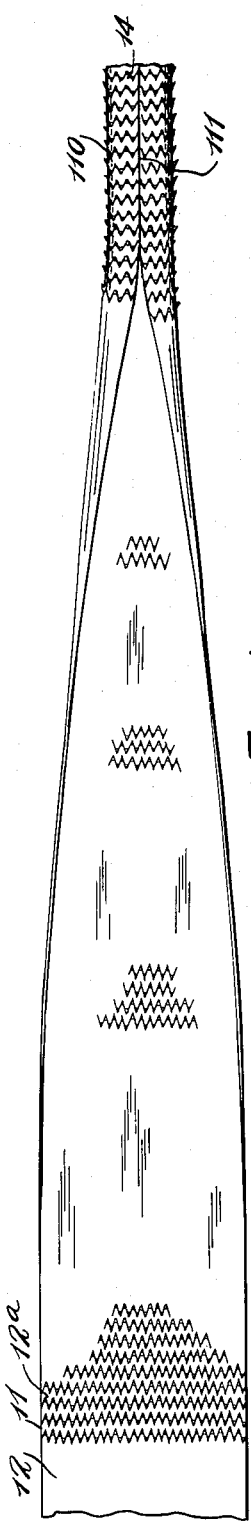
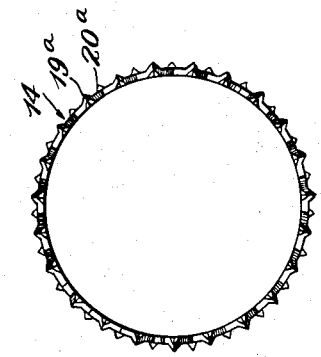
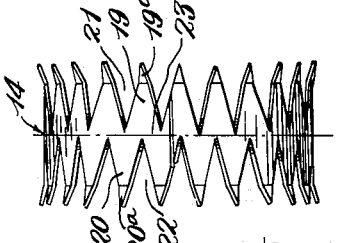
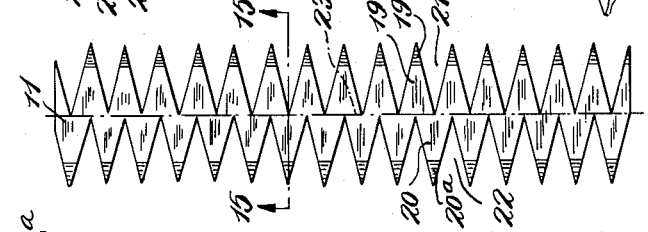
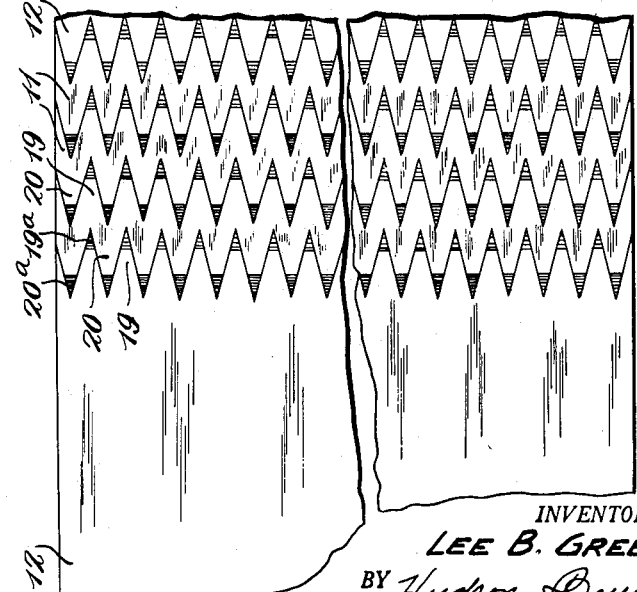
INVENTOR.
LEE B. GREEN
BY Hudson, Doughton,
Williams, David & Hoffmann
ATTORNEYS

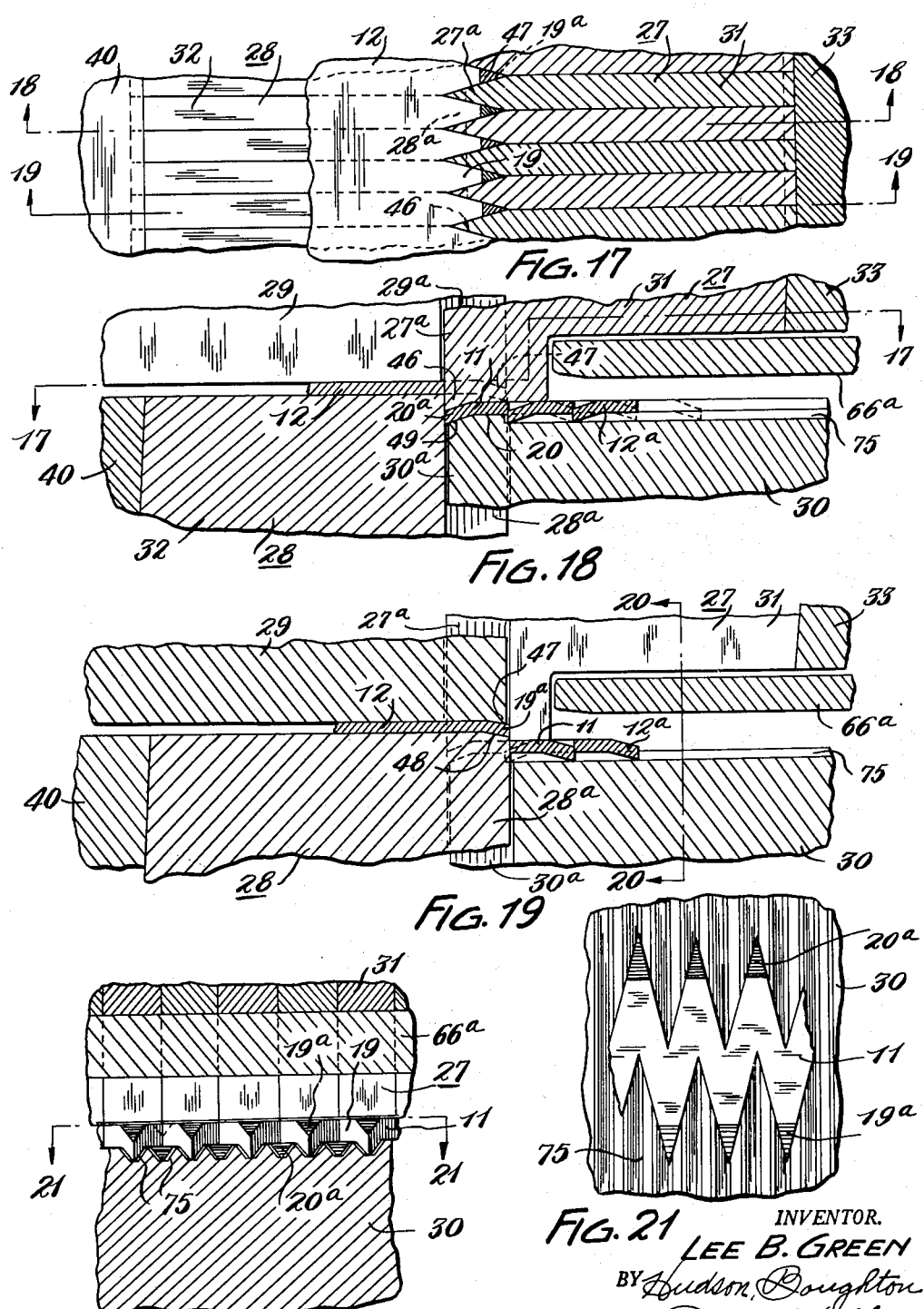

May 15, 1956 L. B. GREEN 2,745,121
APPARATUS FOR FORMING RING-SHAPED FASTENERS FROM FLAT STOCK
Original Filed Jan. 11, 1951 7 Sheets-Sheet 6

INVENTOR.
LEE B. GREEN
BY Hudson, Boughton,
Williams, David & Hoffmann
ATTORNEYS United States Patent Office 2,745,121
Patented May 15, 1956

2,745,121

APPARATUS FOR FORMING RING-SHAPED FASTENERS FROM FLAT STOCK

Lee B. Green, Lakewood, Ohio

Original application January 11, 1951, Serial No. 205,573. Divided and this application January 21, 1953, Serial No. 332,382

22 Claims. (Cl. 10—28)

This invention relates to the manufacture of pronged fasteners of the ring type adapted to be used between and driven into two wood or other penetrable members to be connected, and relates more particularly to improved apparatus for producing such pronged ring fasteners rapidly and economically from sheet metal stock.

This application is a division of original application Serial No. 205,573, filed January 11, 1951.

An object of the present invention is to provide novel apparatus for the production of such pronged ring fasteners in which substantially flat pronged fastener blanks are severed in succession from the leading end of a strip of sheet metal stock and are progressively bent to ring shape to form the completed fasteners.

Another object is to provide novel apparatus for the purpose mentioned in which the pronged fastener blanks severed from the sheet metal strip are maintained in a series relation with the prongs of each blank in interfitting or meshed engagement with the prongs of an adjacent blank so as to constitute a strip of blanks and in which the strip of blanks thus produced is curved transversely to convert the blanks into pronged ring fasteners.

A further object is to provide such novel apparatus in which the strip of pronged fastener blanks is advanced at substantially the rate of production of the blanks and is progressively curved transversely by an inwardly and longitudinally acting wedging bending force applied to opposite longitudinal edge portions of the strip of blanks to convert the latter into a tube from the leading end of which the completed ring fasteners can be disengaged individually or in groups.

Still another object is to provide novel apparatus of the character mentioned in which the strip of pronged blanks is subjected to a progressive transverse bending in a longitudinally tapered or converging reciprocating hollow die member by which the blanks of the strip are curved to the substantially annularly closed ring shape of the completed fasteners.

Yet another object is to provide novel apparatus for the purpose mentioned in which the bending of the strip of blanks transversely thereof is carried out between cooperating relatively reciprocable coaxial inner and outer die members.

This invention also provides such a novel apparatus in which the strip of fastener blanks is advanced intermittently and is held against backward movement during the rest intervals between the intermittent forward movements, and in which the progressive curving of the strip of blanks to the substantially annularly closed shape of the completed fasteners is produced by bending forces applied to the strip by the hollow die member during such rest intervals.

As another object this invention provides novel apparatus of the character just mentioned in which the cooperating relatively reciprocable coaxial inner and outer die members are convergently tapered in the direction of strip travel and define a die passage therebetween having a relatively wide inlet opening adapted to receive the strip of blanks and a substantially annularly closed outlet opening from which the completed pronged ring fasteners are discharged.

Still another object is to provide novel apparatus of the kind referred to in which the tapered inner or convex die member is a stationary mandrel about which the strip of blanks is bent by bending forces imparted thereto by reciprocation of the outer or concave die member, and in which the mandrel has a stem extension projecting from the outer die member and adapted to support the tube of completed pronged ring fasteners being delivered.

The present invention further provides novel apparatus for producing pronged ring fasteners in which cooperating toothed or serrated shearing die members sever the successive pronged fastener blanks from the strip of stock and in which certain of the die members have projections thereon adapted to deflect the ends of the prongs out of the plane of the blank such that when the blank is bent to closed ring shape the deflected ends of the prongs will incline away from the axis of the fastener.

As an additional object this invention provides novel apparatus of the character mentioned in which the taper of the cooperating coaxial die members is relatively long and bears a relation to the deflection of the prong ends and to the thickness of the stock from which the fastener blanks are formed, such that the prongs of adjacent blanks of the strip of blanks will remain in meshed relation during the progressive bending of the strip of blanks to complete the ring shape of the fasteners.

Yet another object is to provide novel apparatus for making pronged ring fasteners in which the major portion of the transverse curving of the strip of blanks is accomplished between the inner mandrel die member and the reciprocably movable hollow outer die member, and in which a further bending of the blanks to a substantially closed ring form is accomplished by a pair of cooperating die rolls connected with the outer die member for translatory movement therewith.

The invention can be further briefly summarized as consisting in certain novel combinations and arrangements of parts, hereinafter described and particularly set out in the claims hereof.

In the accompanying sheets of drawings:

Fig. 5 is a longitudinal vertical section corresponding with the portion of Fig. 2 which illustrates the curving die mechanism for curving the strip of blanks, but showing such curving die mechanism on a larger scale;

Fig. 6 is a partial transverse section showing the receiving end of the curving die mechanism, the view being taken substantially as indicated by line 6—6 of Fig. 5;

Figure 22:
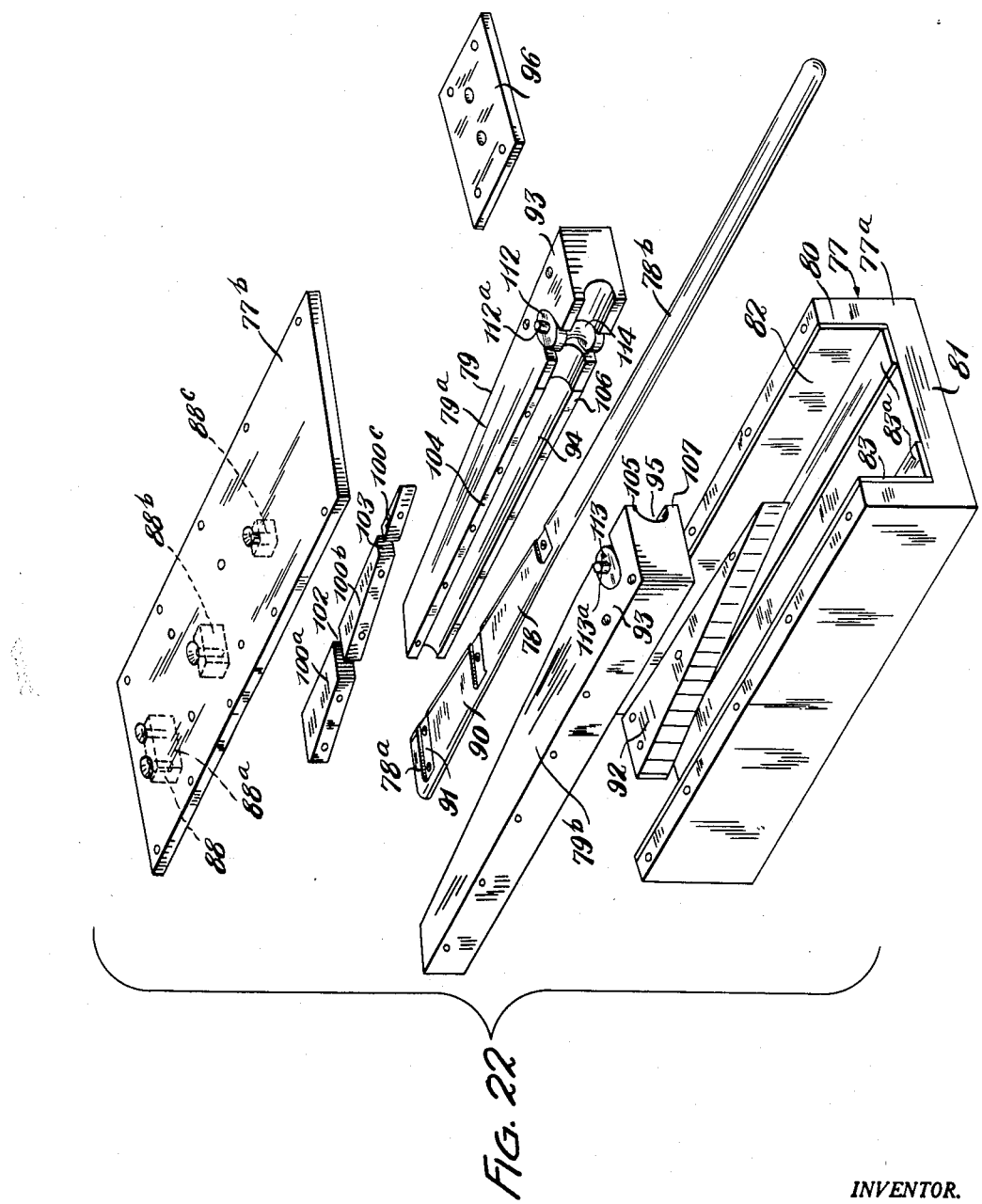
Figure 23:
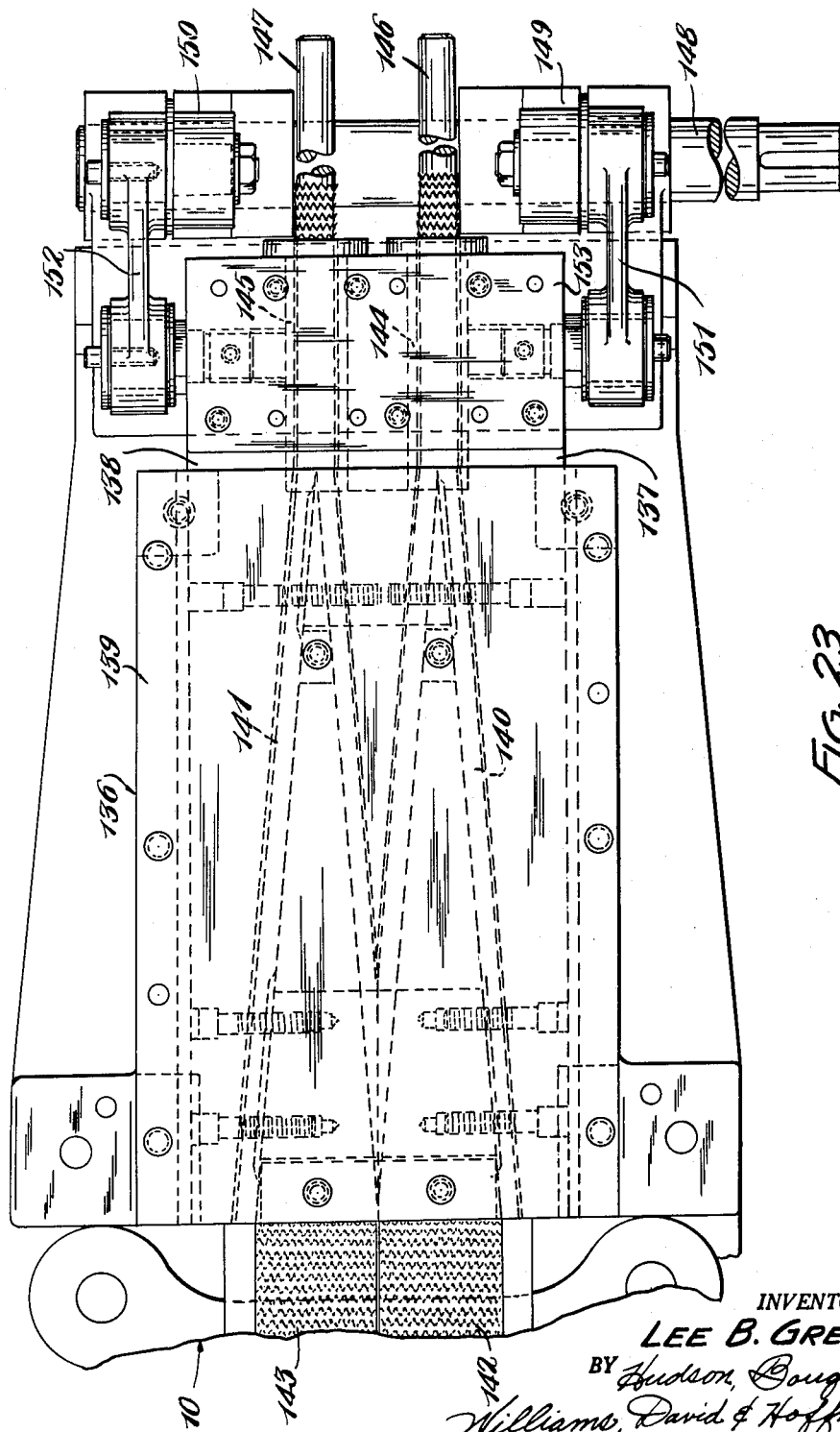

Figs. 7, 8 and 9 are transverse sections taken through the curving die mechanism substantially as indicated by section lines 7—7, 8—8 and 9—9, respectively, of Fig. 5;

Fig. 10 is a perspective view of the inner die member or mandrel of the curving die mechanism and showing such inner die in detached relation;

Fig. 11 is a plan view of the strip of fastener blanks showing the progressive change in the shape of this strip from flat to tubular shape;

Fig. 12 is a side elevation of a completed pronged ring fastener of the kind produced by the method and apparatus of the present invention;

Fig. 13 is an end view of the completed fastener;

Fig. 14 is a plan view of a flat or developed pronged fastener blank showing the same as produced by the shearing die mechanism and prior to being curved to ring shape;

Fig. 15 is a sectional view taken transversely of the fastener blank as indicated by section line 15—15 of Fig. 14;

Fig. 16 is a partial plan view, on an enlarged scale, showing the leading end of the strip of stock and several fastener blanks which have been sheared therefrom and which are in meshed relation forming the rear end of the strip of blanks;

Fig. 17 is a partial horizontal sectional view taken through the shearing die mechanism substantially as indicated by section line 17—17 of Fig. 18;

Figs. 18 and 19 are partial longitudinal sectional views taken through the shearing die mechanism at laterally spaced points, as indicated by section lines 18—18 and 19—19, respectively, of Fig. 17;

Fig. 20 is a partial transverse sectional view taken through the shearing die mechanism substantially as indicated by line 20—20 of Fig. 19;

Fig. 21 is a fragmentary horizontal view of the lower stripper of the shearing die mechanism, the view being taken substantially as indicated by line 21—21 of Fig. 20;

Fig. 22 is an exploded view in perspective showing the component parts of the curving die mechanism; and Fig. 23 is a plan view showing a modified form of the curving die mechanism.

This novel apparatus for producing pronged ring fasteners comprises, in general, a shearing die mechanism 10 by which pronged fastener blanks 11 in a substantially flat or developed form are severed in succession from the leading end of a strip of sheet metal stock 12 and a curving die mechanism 13 by which the pronged fastener blanks are curved to a substantially closed annular shape to thereby convert the blanks into pronged ring fasteners 14. The novel apparatus also includes a feed mechanism 15 for advancing the strip of stock 12 to the shearing die mechanism 10 and which also supplies the forward motion for advancing the fastener blanks through the curving die mechanism 13. Additionally, the novel apparatus includes punch press mechanism 17 for actuating the shearing die mechanism 10 and lever mechanism 18 for actuating the curving die mechanism 13.

Before proceeding with the more detailed description of the apparatus, it is appropriate at this point to describe the pronged ring fastener 14 and the pronged fastener blank 11 from which the completed fastener is formed. As shown in Figs. 12 and 13 the fastener 14 is a ring-shaped sheet metal member having oppositely extending annular groups of substantially triangular prongs 19 and 20 adapted to be driven into two bodies, of wood or other penetrable material, between which the fastener is disposed and which are to be connected by such fastener.

The pronged ring fastener 14 is more fully disclosed and is claimed in copending patent application Serial No. 74,776, filed February 5, 1949, and now Patent No. 2,558,131, granted June 26, 1951. As to the manner of using the fastener 14, it is sufficient for the purposes of the present application to explain that when the fastener is disposed between a pair of wood members and the annular groups of prongs 19 and 20 are forced into such wood members these prongs become deflected outwardly or clinched as they imbed themselves in the wood members, thus enabling the fastener to form a rigid and durable connection for holding such wood members firmly together.

As shown in Figs. 12 and 13, the prongs constituting the annular groups of prongs 19 and 20 are disposed in circumferentially offset or staggered relation such that the substantially triangular notches 21 formed between each pair of prongs 19 will be located in axial alignment with the prongs 20 of the opposite group and, similarly, the substantially triangular notches 22 formed between the pairs of adjacent prongs 20 will be located in axial alignment with the prongs 19. The prongs 19 and 20 are of such proportions that they will readily enter the wood members when the fastener is subjected to an appropriate driving force.

To facilitate the outward deflection or clinching of the prongs 20 and 21 as they are forced into the wood members, the free end portions or tops 19a and 20a are initially deflected outwardly so as to stand in an obtuse angle relation to the axis of the fastener. To enable the fastener 14 to draw the wood members tightly together, the notches 21 and 22 are of such depth that their apices will lie on or adjacent a circumferential median line 23.

The completed pronged ring fasteners 14 are formed from the substantially flat pronged fastener blanks 11 which have been sheared in succession from the leading end of the strip of sheet metal stock 12. As shown in Figs. 14, 15 and 16, the fastener blanks 11 have oppositely extending rows of the prongs 19 and 20 thereon with the intervening notches 21 and 22 between the pairs of adjacent prongs. The prong end 19a and 20a of the prongs 19 and 20 have been deflected downwardly out of the plane of the blank such that when the blank is curved to annular shape these prong ends will stand in the above-mentioned outwardly deflected obtuse angle relation to the axis of the fastener.

It will be seen from Figs. 14 and 16, and from various other views of the drawings, that one of the prong edged fastener blanks 11 is severed from the leading end of the stock strip 12 by each shearing operation. It will also be seen that during each shearing operation, a transversely extending row of the V-shaped notches 21 is cut in the stock strip and that the V-shaped segments thus sheared out of these notches of the stock strip form the rear row of prongs 20 of the blank. In this novel method, the row of notches 21 being cut by the shearing operation is located at a point on the stock strip which is in such close relation to the previously cut row of these notches remaining on the extreme leading end of the strip, that the oppositely extending V-shaped prongs 19 and 20 will have their bases located substantially on the median line 23 of the blank being produced.

When the fastener blanks 11 are sheared from the leading end of the stock strip 12 they are completely severed from the stock strip but remain in the relation shown in Fig. 16 in which the prongs 20 of the rear edge of one fastener blank are in meshing engagement with the prongs 19 of the forward edge of the next succeeding fastener blank. When the flat fastener blanks 11 are in this inter-engaged or meshed relation they constitute a so-called strip of blanks 12a to which further reference will be made hereinafter.

Figure 4:
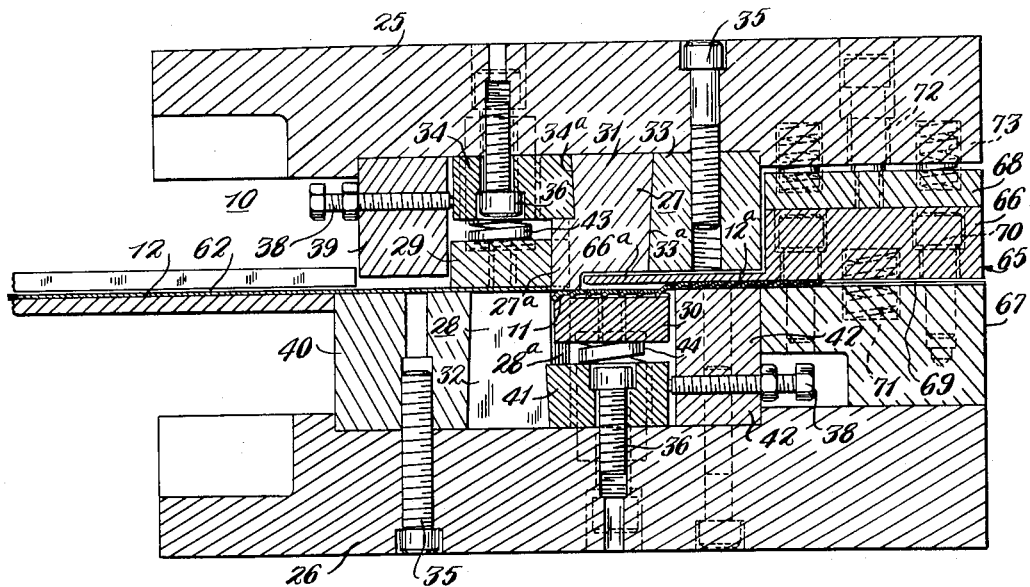
Fig. 4 is a longitudinal vertical section similar to that of Fig. 3 but showing the cooperating punch and stake die members in closed position.
Figure 3:
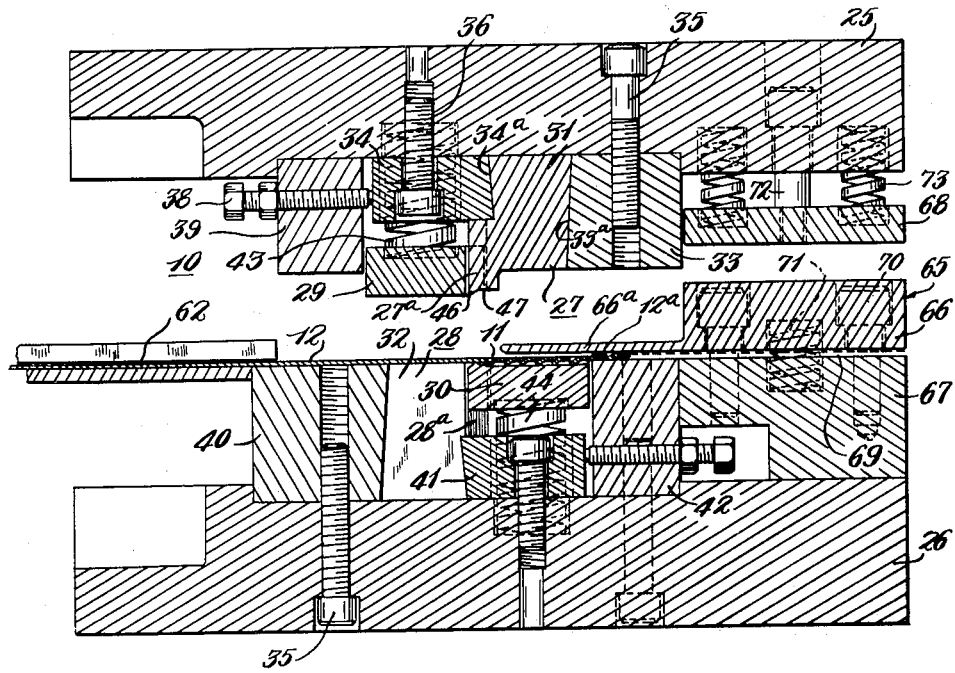
Fig. 3 is a longitudinal vertical section corresponding with the portion of Fig. 2 which illustrates the cooperating punch and stake die members of the shearing die mechanism, but showing such die members on a larger scale and in an open position.

As shown in Figs. 3 and 4, the shearing die mechanism 10 includes a pair of upper and lower carrier plates 25 and 26 of which the lower carrier plate 26 is a stationary member and the upper carrier plate member 25 is reciprocably movable relative to the lower carrier plate. The shearing die mechanism 10 also includes an upper or punch shearing die member 27 and a lower or stake shearing die member 28. Additionally, this shearing die mechanism includes upper and lower stripper die members 29 and 30.

The upper and lower shearing die members 27 and 28 have groups of teeth or serrations 27a and 28a thereon extending toward each other but with the teeth of these groups laterally offset a distance such that the teeth 27a of the punch 27 will be capable of moving downwardly between the teeth 28a of the stake die member 28. The teeth 27a of the punch 27 and the teeth 28a of the stake 28 correspond in plan size and shape respectively with the prongs 20 and 19 of the fastener blanks 11. During each such downward movement of the punch 27 in shearing relation to the stake 28, the teeth 27a of the punch will shear the stock strip 12 transversely thereof along a zig-zag line corresponding with the tooth profile of the fastener blank and thereby shear one of the fastener blanks 11 from the leading end of the stock strip.

The punch and stake die members 27 and 28 are here shown as embodying a novel construction in that these die members are composed of groups of blades 31 and 32 disposed in vertically edgewise relation with the blades of each group in face-to-face engagement. The teeth 27a and 28a constituting the shearing elements of these die members are formed by the tapered upright end edges of these grouped blades. When the die members 27 and 28 are composed of such groups of component blades they can be more economically constructed and maintained in a sharp condition because the tapered end edges constituting the shearing teeth can be more readily and accurately formed on individual blades by appropriate machining or grinding operations than they could be on a solid die block.

The blades 31 constituting the punch 27 can be mounted on the carrier plate 25 in the above-described grouped relation by the use of clamping blocks 33 and 34 (see Figs. 3 and 4) between which the blades are disposed and which clamping blocks are connected with the carrier plate by suitable screws 35 and 36. The clamping blocks 33 and 34 have the adjacent faces 33a and 34a thereof disposed in oppositely inclined relation so as to define therebetween a dovetail-shaped space or recess in which the dovetail-shaped upper portions of the blades 31 engage.

The clamping block 34 has limited shifting movement relative to the clamping block 33 for locking or releasing the blades 31. Such shifting of the clamping block 34 toward the clamping block 33 is produced by actuating screws 38 extending through a backing block 39 which is also mounted on the carrier plate 25. After the clamping block 34 has been shifted by the actuating screws 38 toward the clamping block 33 to grip the dovetail portions of the blades 31 therebetween, the connecting screws 36 are tightened to maintain the clamping block 34 in this relation.

The group of blades 32 of the lower or stake shearing die member 28 are mounted on the lower carrier plate 26 in a similar manner by the provision of a pair of clamping blocks 40 and 41 and a backing block 42.

The strippers 29 and 30 are upper and lower die members which are in the form of movable blocks located adjacent the clamping blocks 34 and 41 and which cooperate, respectively, with the shearing die members 28 and 27. The upper stripper 29 has a row of teeth or serrations 29a formed on the front edge thereof and which are in meshing engagement with the teeth 27a of the punch 27. Similarly, the lower stripper 30 is provided with a row of teeth 30a on the upright rear edge thereof which are in meshing engagement with the teeth 28a of the stake 28. The upper stripper 29 is engageable with the upper surface of the stock strip 12 for applying pressure thereto, as shown in Fig. 4, and the lower stripper 30 is engageable with the lower surface of the rear end portion of the strip 12a of fastener blanks and with the lower surface of the extreme front end portion of the stock strip 12, as shown in Fig. 3.

The upper stripper 29 is movable toward and away from the clamping block 34 during the closing and opening movements of the punch 27 and the outward or downward movement of this stripper away from the clamping block 34 is produced by compression springs 43 disposed between this stripper and the carrier plate 25. The lower stripper 30 is movable toward and away from the clamping block 41 during the closing and opening movements of the punch 27 and the outward or upward movement of this stripper away from the clamping block 41 is produced by compression springs 44 disposed between this stripper and the lower carrier plate 26.

The lower stripper 30 forms a yieldable support for the end portion of the stock strip 12 which overlies the teeth 28a of the stake 28, as shown in Fig. 3, and which overlying portion is about to be severed from the stock strip by the punch 27. When this overlying portion is severed from the stock strip it forms a fastener blank 11 which is gripped between the stripper 30 and the punch 27 and is carried downward by the punch in the completion of the shearing action performed by the latter. When the punch 27 is moved upwardly by the carrier plate 25 following this shearing operation, the fastener blank 11 just produced is lifted by the lower stripper 30 to a position in meshed alignment with the previously severed fastener blanks.

Another important feature of the shearing die mechanism 10 is that the punch 27 and the upper stripper 29 are provided with rows of depending projections or lugs 46 and 47 which are carried by the teeth 27a and 29a, respectively, and act on the stock strip 12 during the shearing operation to deflect downwardly the end portions 19a and 20a of the teeth 19 and 20 of the fastener blank 11 being formed. The lugs 46 and 47 are located at the ends of the teeth 27a and 29a and are formed as integral depending extensions of these teeth. To permit such downward deflection of the ends of the prongs of the fastener blank being formed, the end portions of the teeth 28a and 30a of the stake 28 and the lower stripper 30 are beveled downwardly, as is best shown in Figs. 18 and 19, and these bevels are indicated by the reference characters 48 and 49.

During the closing movement of the die mechanism 10, the depending lugs 46 and 47 of the punch 27 and the upper stripper 29 engage the upper surface of the stock strip 12 ahead of other portions of these die members and the depending lugs 46 start the shearing operation by which the next fastener blank 11 will be sheared from the leading end of the stock strip. The continued downward closing movement of the punch 27 causes the teeth 27a thereof to complete the shearing of the prongs 20 from the stock strip 12. During this shearing operation the lugs 46 cooperate with the beveled portions 49 of the lower stripper 30 to deflect the ends 20a of the prongs 20 downwardly. Also during this shearing operation the lugs 47 of the upper stripper 29 cooperate with the beveled portions 48 of the stake 28 to deflect the ends 19a of the prongs 19 downwardly.

The shearing of a fastener blank 11 from the leading end of the stock strip 12 leaves on the stock grip a row of prongs 19 for the next succeeding blank to be sheared from the stock strip. The row of prongs 19 thus formed on the leading end of the stock strip 12 will be completely formed prongs having the downwardly deflected ends 19a such that when the next fastener blank 11 is sheared from such leading end of the stock strip it will only be necessary for the shearing operation to form the prongs 20 and the downwardly deflected ends 20a. Thus each closing of the die mechanism 10 will result in a completely formed fastener blank 11 being severed from the stock strip 12.

During the opening movement of the die mechanism 10 the upper carrier plate 25 is moved upwardly away from the stationary lower carrier plate 26 and, during the initial portion of this opening movement, the springs 43 maintain the upper stripper 29 stationary for a short interval of time thereby holding the stock strip 12 clamped against the stake 28 until the groups of shearing teeth 27a and 28a of the die members 27 and 28 have separated from each other. During such opening movement of the die mechanism 10, the lower stripper 30 is lifted by the springs 44, thereby elevating the last-severed fastener blank 11, and also several previously severed adjacent blanks, to a position of axial alignment with the strip 12a of fastener blanks, as shown in Fig. 3.

The opening and closing actuation of the shearing die mechanism 10 is accomplished by suitable actuating mechanism which is here shown as being a conventional punch press 17 (see Figs. 1 and 2) having a bed 51 and a reciprocable ram or slide 52. The upper carrier plate 25 is suitably attached to the lower end of the ram 52 and the lower carrier plate 26 is suitably mounted on a table 53 which is in turn carried by a bolster plate 54 mounted on the bed 51. As is customary in punch presses, the ram 52 is actuated in a conventional manner from a crankshaft (not shown) such as to produce the desired reciprocating opening and closing movements of the upper carrier plate 25 relative to the lower carrier plate 26.

The feed mechanism 15 advances the stock strip 12 to the die mechanism 10 with an intermittent forward movement in timed relation to the opening and closing movement of this die mechanism. This feed mechanism is here shown as comprising a pair of cooperating upper and lower feed rolls 55 and 56 which are adapted to grip the stock strip 12. One or both of the feed rolls 55 and 56 are adapted to be driven by linkage actuated from the crankshaft of the punch press 17.

In this instance the actuating linkage for the feed rolls is shown as comprising a lever 57 which is drivingly connected with the lower feed roll 56 by means of a ratchet wheel 58 and a pivoted pawl 59. The lever 57 is rockable about the axis of the lower roll 56 and carries the pawl 59. A thrust link 60 connects the lever 57 with the crankshaft of the punch press. Swinging movements imparted to the lever 57 cause the lower feed roll to be driven with an intermittent forward feeding movement by the ratchet wheel 58 and the pawl 59 to thereby advance the stock strip 12 to the shearing die mechanism 10 with a step-by-step movement.

The stock strip 12 may be supplied from an available source of supply such as a roll of this strip material from which the strip is withdrawn by the feed rolls 55 and 56 of the feed mechanism 15. In passign from the feed rolls to the shearing die mechanism 10, the strip 12 is supported on a feed plate 61 and is confined in a longitudinal guideway 62 by the overlapping edge portions 63a of a pair of laterally spaced strips 63. The strip 12a formed by the intermeshed fastener blanks 11 passes to the curving die mechanism 13 by moving through a clamping device 65. This clamping device serves to hold the strip of blanks against backward movement during the operation of the curving die mechanism 13 and is constructed and operated as a part of the shearing die mechanism 10.

The clamping device 65 comprises a pair of upper and lower clamping members 66 and 67 and a pressure plate 68. These clamping members 66 and 67 define therebetween a longitudinal guide passage 69 which is aligned with the guideway 62 and direct the strip 12a of fastener blanks to the curving die mechanism 13. The lower clamping member 67 is located immediately adjacent the backing block 42 and is secured to the lower carrier plate 26.

The upper clamping member 66 is connected with the lower clamping member 67 by screws 70 which permit a limited movement of this upper clamping member toward and away from the lower clamping member for clamping or releasing the strip 12a of fastener blanks. Compression springs 71 disposed between the clamping members 66 and 67 act on the upper clamping member to normally urge the same away from the lower clamping member so as to release the clamping pressure on the strip of blanks. As shown in Figs. 3 and 4 the upper clamping member 66 is provided with an integral lateral extension 66a which projects rearwardly in overlying relation to the backing block 42 and a portion of the lower stripper 30.

The pressure plate 68 is connected with the upper carrier plate 25 by screws 72 which permit relative movement between the pressure plate and this carrier plate. Compression springs 73 disposed between the upper carrier plate and the pressure plate 68 act on the latter to normally urge the same in a downward direction away from the carrier plate.

When the die mechanism 10 is being closed by downward movement of the carrier plate 25, the pressure plate 68 engages the upper clamping member 66 before the punch 27 or the upper stripper 29 engages the stock strip 12 and applies downward pressure to this upper clamping member, causing the same to compress the springs 71 nad clamp the strip 12a of blanks against the lower clamping member 67. Such downward movement of the upper clamping member 66 also causes the extension portion 66a thereof to cooperate with the backing block 42 and the stripper 30 to apply clamping pressure to the portions of the strip 12a which are located in overlying relation to this backing block and stripper.

While this clamping pressure is maintained on the strip 12a of fastener blanks by the upper clamping member 66 this strip is held against backward movement so as to enable the curving die mechanism 13 to carry out its curving function, as explained hereinafter. The holding of the strip of blanks against backward movement by the upper clamping member 66 also prevents jamming of the dies 27 and 28 during the shearing operation such as might otherwise occur if movement or pressure were transmitted in a backward direction through the previously sheared fastener blanks to these shearing dies or to the leading end of the stock strip 12.

The bottom of the guide passage 69 of the clamping device 65 is formed by the top surfaces of the lower clamping member 67, the backing block 42 and the stripper 30 and during the advance movement of the strip 12a of blanks the individual blanks 11 slide on these top surfaces. To prevent the downwardly deflected prong ends 19a and 20a of the fastener blanks from becoming flattened or dulled by the clamping pressure being applied by the clamping device 65, a plurality of longitudinal grooves 75 of substantially triangular cross-section are formed in the top surface of the stripper 30, the backing block 42 and the clamping member 67. These grooves accomodate the downwardly deflected ends of the prongs 19 and 20 of the fastener blanks while the blanks are in the passage 69.

As shown in Figs. 20 and 21, the grooves 75 are disposed in a laterally spaced relation corresponding with the lateral spacing of the prongs 19 and 20 of the fastener blanks 11. The grooves 75 of the stripper 30, the backing block 42 and the lower clamping member 67 are in an aligned relation so as to form continuous channels in which the downwardly deflected prong ends are longitudinally movable during the advance travel of the strip of blanks.

Figure 2:
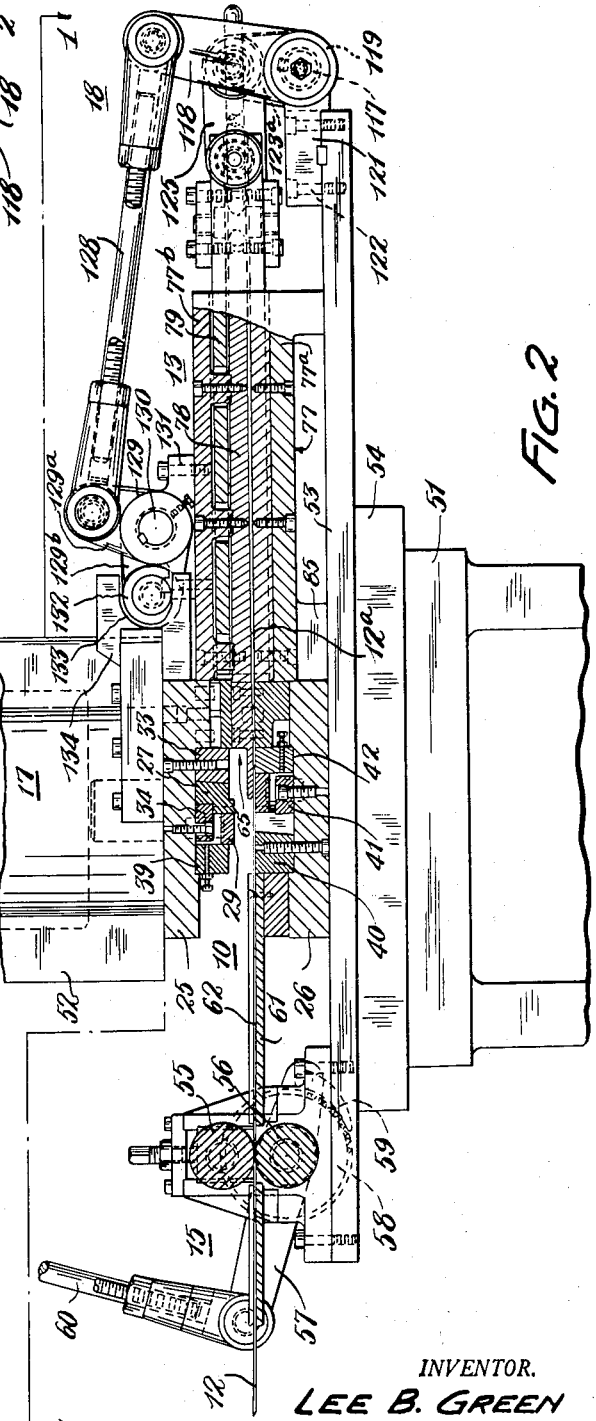
Fig. 2 is a longitudinal vertical section taken through the apparatus on the irregular section line 2—2 of Fig. 1.

The curving die mechanism 13 and its function constitute an important part of this invention and will be described next. As shown in Figs. 2 and 5, the curving die mechanism 13 is mounted on the table 53 to the right of and immediately adjacent the shearing die mechanism 10 so as to receive the strip 12a of fastener blanks from the latter. The curving die mechanism comprises, in general, a longitudinal guidebox 77 and a pair of coaxially extending inner and outer curving dies 78 and 79 disposed in such guidebox.

The guidebox 77 comprises a channel-shaped bottom member 77a and a cover 77b. The channel-shaped bottom member 77a has laterally spaced upright side walls 80 connected by a transverse bottom wall 81 such that these walls define a longitudinal guideway 82. The side and bottom walls are preferably provided with a lining of suitable bearing material 83. The bottom member 77a is secured to the table 53 as by means of the screws 84 which extend into integral depending legs 85 provided at the ends of this bottom member and which are held against the table by the attaching screws.

The cover 77b is secured to the side walls 80 of the bottom member 77a in covering relation to the guideway 82, as by suitable screws 86. The cover is also provided on the underside thereof with strips 87 of suitable bearing material. The cover 77b also forms a support for the inner die member 78 and, for this purpose, is provided with longitudinally spaced depending abutment lugs 88a, 88b and 88c against which the inner die member is held by clamping screws 89.

The inner die member 78 is in the form of a longitudinally extending convexly curved mandrel which varies progressively in shape from a relatively wide flat portion 78a at the receiving end of the curving die mechanism 13 to a substantially circular rod portion 78b at the delivery end of the curving die mechanism. The longitudinal side edges 90 of the flat portion of this inner die are rounded to a radius of curvature corresponding substantially with the radius of curvature of the rod portion 78b such that the longitudinally converging taper of these rounded side edges will merge smoothly into the rod portion 78b.

The inner die or mandrel 78 preferably has transverse recesses 91 formed in the top surface thereof and spaced apart longitudinally to correspond with the spacing of the abutment lugs 88 of the cover 77b. When the die 78 is connected with the cover by the screws 89, the abutment lugs 88 engage in the recesses 91 such that the abutment lugs hold the die firmly in place in the guidebox 77 and absorb the longitudinal thrust to which this die is subjected during the curving operation.

The strip 12a of fastener blanks is delivered into the guidebox 77 beneath the wide flat end 78a of the inner die 78, as shown in Figs. 5 and 6. For supporting the strip 12a in the guidebox such that this strip will lie against the bottom surface of the inner die 78, the guidebox is provided with a strip support 92 which is here shown as being a substantially wedge-shape plate member. The strip support 92 extends longitudinally in the guidebox 77 between the laterally spaced portions 83a of the bearing material carried by the bottom wall 81 and is secured to such bottom wall by suitable screws 92a.

The outer die member 79 of the curving die mechanism 13 is a hollow die member which is concavely curved internally thereof and embraces the inner die member or mandrel 78. As shown in the drawings, this outer die member 79 comprises a pair of elongated die blocks 79a and 79b having complemental longitudinal grooves 94 and 95 in their adjacent faces. At their forward ends the die blocks 79a and 79b have substantially straight portions 93 and the complemental grooves 94 and 95 of these straight portions define a substantially cylindrical passage portion 109b through which the stem or rod portion 78b of the inner die 78 extends.

The die 79 is of such length in relation to the die box 77 that the straight forward ends 93 of the die blocks 79a and 79b project from the forward end of the die box. Rearwardly of the straight portions 93, the die blocks 79a and 79b are of a tapered form with respect to their adjacent faces such that the grooves 94 and 95 thereof extend in a laterally spaced rearwardly diverging relation and embrace the rounded longitudinal side edges 90 of the tapered portion of the inner die 78.

The die blocks 79a and 79b are held in connected relation at their forward ends by a pair of upper and lower splice plates 96 and 97 which are secured to the straight portions 93 by screws 98. The rearwardly extending tapered portions of the die blocks 79a and 79b have tapered spacing blocks 100a, 100b and 100c located therebetween above the grooves 94 and 95 and are held in connected relation by screws 101 which extend through these spacer blocks. The adjacent ends of the spacer blocks 100a and 100b define a gap 102 through which the depending abutment lug 88b of the cover 77b extends and the adjacent ends of the spacer blocks 100b and 100c define another such gap 103 through which the depending abutment lug 88c of the cover extends.

It will be understood that the spacer blocks 100a, 100b and 100c are located between the opposed pair of longitudinal clamping faces 104 and 105 of the die blocks 79a and 79b and that when the die blocks are secured together by the screws 101 the die blocks and spacers form a rigid assembly constituting the outer die member 79. The lower pair of opposed longitudinal faces 106 and 107 of the die block 79a and 79b lie on opposite sides of the strip support 92 as shown in Figs. 6 and 7.

When the inner die or mandrel 78 and the hollow outer die 79 are assembled in the guidebox 77 they occupy the relative positions shown in Figs. 5, 6 and 7, such that the inner and outer die members define therebetween a longitudinal die passage 109 which varies progressively in shape longitudinally of the curving die mechanism from a passage portion 109a having a relatively wide flat bottom at its receiving end (Fig. 6) to a substantially cylindrical passage potrion 109b at its discharge end (Figs. 8 and 9). This die passage is traversed by the strip 12a of fastener blanks and during the forward travel of the strip through this passage, its cross-sectional shape is changed progressively, as shown in Figs. 10 and 11, from a flat strip into a substantially cylindrical tube 110 of completed ring-shaped fasteners 14.

During this progressive change in the shape of the strip 12a of fastener blanks the longitudinal edge portions of the strip are deflected upwardly and inwardly by the concavely curved sides of the die passage 109 so as to conform to the transverse curvature and longitudinal taper of the inner die 78. The upward and inward curving of the longitudinal edges of the strip 12a causes this strip to be progressively wrapped around the inner die and results in these edges ultimately being brought into an opposed or substantially abutting relation, as indicated by the longitudinal line 111 of Fig. 11.

From the construction of the clamping device 65 and the curving die mechanism 13 as thus far described, it will be seen that the die passage 109 of the curving die mechanism is aligned substantially with the guideway 62, such that the die passage and the portion of the guideway extending through the clamping device 65 define a guide passage in which the sheet metal blanks are movable and are confined in a substantially co-planar relation with the adjacent edges of adjacent blanks in abutting engagement. The guide passage in which the strip of blanks travels is defined between the spaced-apart guide surfaces of the members 66 and 67 of the clamping device 65 and between the guide surfaces of the die members forming the curving die mechanism 13. The confinement of the blank in this guide passage prevents buckling of the strip of blanks while such strip is being advanced by the pushing force being supplied by the feed mechanism 15 and also while the strip of blanks is being curved transversely by the impingements of the die member 79 thereagainst.

In accomplishing the upward and inward curving of the longitudinal edges of the strip 12a, the outer die 79 is reciprocated in the guidebox 77 such that during each working stroke of this outer die it moves rearwardly around and in closing relation to the tapered portion of the inner die 78, causing the divergently tapered transversely curved walls of the grooves 94 and 95 to impinge the longitudinal edges of the strip and bend the same around against the curved longitudinal edges of the inner die. These working strokes need be of only a relatively short travel, inasmuch as a short longitudinal movement of the outer die in a rearward direction will cause a rapid closing of the diverging grooves 94 and 95 relative to the longitudinal side edges of the tapered flat portion of the inner die 78.

The impingement of the longitudinally divergent transversely curved walls of the hollow outer die 79 against the opposite edge portions of the strip by the successive rearward strokes of this die, results in wedging impact impact bending forces being repeatedly applied to such edge portions externally of the tubular shape into which the strip is being converted. These impact bending forces are therefore substantially opposed wedgingly inwardly and longitudinally acting impact bending forces which are very effective in causing the progressive curving of the strip to tube form while it is being advanced through the curving die mechanism.

The working strokes which produce the closing movement of the outer die 79 relative to the inner die 78 are carried out in such timed relation to the functioning of the shearing die mechanism 10 and the clamping device 65 that during the bending of the longitudinal edges of the strip 12a around the inner die the strip will be stationary and will be held against backward movement by the clamping device. During the return or opening movement of the outer die 79 relative to the inner die 78 and during such time that the outer die is in its open position, the strip 12a is free to be advanced by increments of forward movement applied to the rear end of this strip by the leading end of the stock strip 12.

For accomplishing the final portion of the curving of the strip 12a of blanks into the tube 110, the outer die 79 is preferably provided with a pair of cooperating roll 112 and 113 which are located respectively in recesses of the straight end portions 93 of the die blocks 79a and 79b. The rolls 112 and 113 have annular grooves 114 therein corresponding in curvature with the tubular delivery portion 109b of the die passage such that when the forward end of the strip 12a traverses this delivery portion, these rolls will squeeze and size the tube 110 by a transversely inwardly acting rolling pressure applied to opposite sides of the partially closed tube, so as to bring the edges thereof into substantially meeting relation along the line 111 and such that the completed fasteners 14 will all be of a substantially uniform diameter. The rolls 112 and 113 are rotatably mounted in the splice plates 96 and 97 and, for this purpose, are provided with shaft extensions 112a and 113a which are journaled in suitable bushings 115 carried by these splice plates.

As shown in the drawings, the rod portion 78b of the inner die 78 is of a length to extend through and project from the tubular delivery portion 109b of the die passage and the forwardly projecting portion of this rod constitutes a support for the tube 110 of completed pronged ring fasteners 14. Since the blanks from which these fasteners have been shaped are completely severed from each other, it will be seen that the fasteners are maintained in the tubular relation merely by the inter-engagement or meshing of the prongs of adjacent fasteners. The completed fasteners can therefore be readily disengaged from the leading end of the tube 110, either as individual fasteners or as stacks of such fasteners. The completed fasteners 14 which have been thus disengaged from the leading end of the tube 110 can be suitably packaged for sale either in a bulk condition or as stacks of fasteners for use in the magazines of various fabricating machines.

Various forms of actuating mechanism can be employed for imparting the reciprocating working and return strokes to the outer die member 79 of the curving die mechanism 13. In this instance actuating mechanism 18 is provided which includes a transverse rockshaft 117 located adjacent the right-hand end of the table 53 and to which rocking movements are imparted by a lever 118. The rockshaft 117 is journaled in a pair of laterally spaced arms 119 and 120 of a bearing bracket 121 which is secured to the table 53 as by means of the screws 122.

A forked lever 123 mounted on and keyed to the rockshaft 117 between the arms 119 and 120 of the bearing bracket 121 has a pair of upwardly projecting laterally spaced lever arms 123a and 123b. Pivot pins 124 carried by the upper ends of the lever arms 123a and 123b project outwardly therefrom in laterally aligned relation. A pair of links 125 and 126 connect thearms 123a and 123b with the forward end of the outer die 79. For this purpose the thrust links 125 and 126 are pivoted at one end thereof on the pivot pins 124 and at the opposite end thereof are connected with the outer die 79 by means of a pair of pivot pins 127. The pivot pins 127 are here shown as being in the form of studs mounted in the straight end portions 93, the die blocks 79a and 79b and projecting laterally outwardly therefrom in substantially aligned relation.

The actuating mechanism 18 also includes a link 128 connecting the lever 118 of the rockshaft 117 with a bellcrank lever 129. The lever 129 is carried by a shaft 130 which is journaled in a bearing bracket 131 mounted on the cover 77b of the guidebox 77. The bellcrank lever 129 comprises lever arms 129a and 129b, of which the lever arm 129a is pivotally connected with the link 128. The lever arm 129b carries a roller 132 which engages in the recess 133 of a bracket 134 which is carried by and reciprocably movable with the ram 52 of the punch press 17. When the die member 79 of the curving die mechanism 13 is actuated by movement transmitted from the ram 52 of the punch press 17 through an arrangement of levers and links such as that just described above, it will be seen that the strokes of the die member 79 will be produced in a desired timed relation to the actuation of the shearing die mechanism 10 and the clamping device 65, as well as in timed relation to the intermittent forward movement provided by the feed device 15 for the stock strip 12 and the strip 12a of fastener blanks.

Before summarizing the detailed operation of the novel apparatus of this invention, it should be explained that the sheet metal of the stock strip 12 can be of any desired thickness or gauge, depending upon the nominal size and requirements of the pronged ring fasteners 14 being produced. The longitudinal taper of the inner and outer dies 78 and 79 of the curving die mechanism 13 bears an important relation to the thickness of the sheet metal of the stock strip 12 and to the angularity or extent of deflection of the prong ends 19a and 20a, in that the taper angle of these die members should be of such gradual slope that the prongs of the adjacent fastener blanks 11 of the strip 12a will remain in the above explained inter-engaged or meshed relation during the curving of the strip into the tube 110. It is important that the prongs of the adjacent fastener blanks 11 of the strip 12a remain in such meshed relation because the advance movement of all of the fastener blanks through the curving die mechanism 13 can then be produced by motion supplied to the rear end of the strip 12a by the leading end of the stock strip 12.

The production of the pronged ring fasteners 14 by the novel apparatus of this invention has already been explained to a considerable extent in the foregoing detailed description, such that only a summarization of the detailed operation will need be given at this point. The strip 12 of sheet metal stock is advanced with a step-by-step feeding movement by the feed roll mechanism 15. Fig. 3 shows the leading end of the strip stock 12 in a position overlying the stake die member 28 and the lower stripper 30 and in readiness for the shearing of the next fastener blank 11 therefrom by the punch 27 and the stripper 29. Fig. 4 shows the die members of the shearing die mechanism 10 in their closed position in which the next fastener blank referred to above has just been sheared from the leading end of the stock strip 12.

During the closing of the die mechanism 10, the gripping device 65 is actuated to apply a clamping force to a small number of the fastener blanks constituting the rear end of the strip 12a. This clamping of the rear end of the strip of blanks in the clamping device 65 holds the strip of blanks against backward movement and prevents the fastener blanks which have just been sheared from the stock strip 12 from being pushed against the leading end of the stock strip such as might cause jamming of the shearing die mechanism during the shearing of the next fastener blank from the stock strip.

While the rear end of the strip 12a of fastener blanks is being clampingly held against backward movement by the clamping device 65, the ram 52 of the punch press 17 continues its downward movement to carry out the shearing of the fastener blank from the stock strip 12. This continued downward movement of the ram 52 causes a counter-clockwise rocking movement to be imparted to the bellcrank lever 129 by the bracket 134. This rocking movement of the bellcrank lever 129 applies a pulling force through the link 128 which swings the lever 118 toward the left, thereby causing the thrust links 125 and 126 to transmit actuating movement to the outer die 79 of the curving die mechanism 13.

The resulting movement of the outer die 79 toward the left causes the concavely curved internal wall portions of this die member which define the die passage 109 to impinge against the longitudinal side edges of the strip 12a and curve such side edges upwardly and inwardly around the inner die 78. The working strokes of the ram 52 can be carried out very rapidly and, with each closing of the die mechanism 10 to produce another one of the fastener blanks 11, the outer die 79 of the curving die mechanism 13 will be moved through a working stroke to impart a bending force to the longitudinal side edges of the strip 12a.

During the opening of the die mechanism 10, the ram 52 moves upwardly thereby rocking the bellcrank lever 129 in a clockwise direction and transmitting motion to the outer die 79 in a direction to retract or open the same relative to the inner die 78. The upward movement of the ram 52 also releases the clamping force being applied to the rear end of the strip of blanks by the clamping device 65, after which the feed mechanism 15 is actuated by the link 60 to impart another forward feeding movement to the stock strip 12. During such forward feeding movement of the stock strip 12, its forward end pushes the strip 12a of fastener blanks in a forward direction, thereby advancing this strip a similar distance into the curving die mechanism 13.

Figure 1:
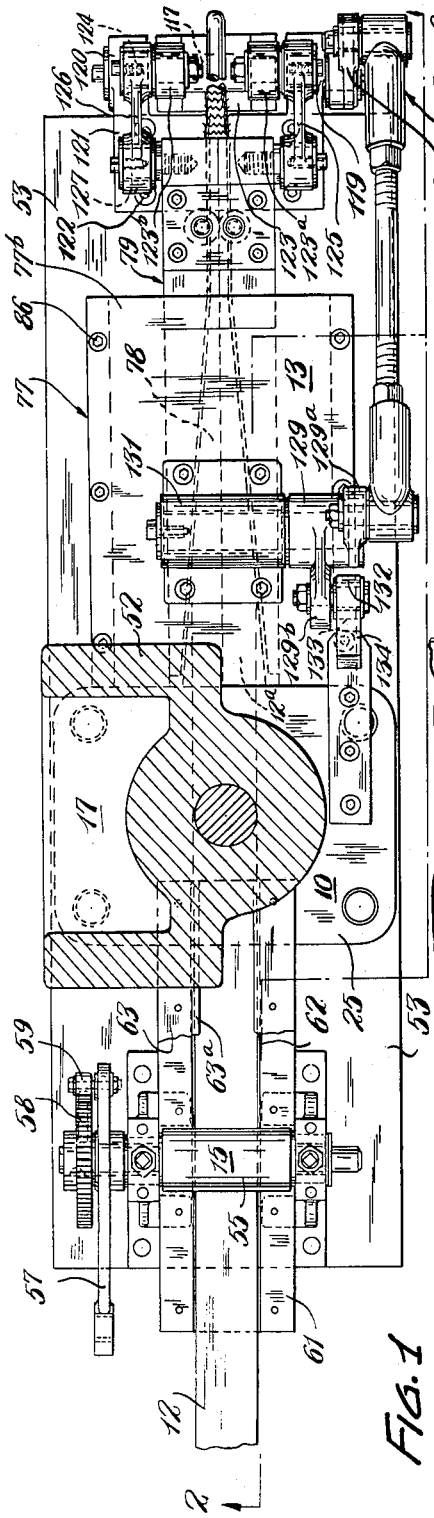
Fig. 1 is a plan view showing improved apparatus for the production of pronged fasteners of the ring type in accordance with the present invention, the apparatus being viewed in plan substantially as indicated by line 1—1 of Fig. 2.

As the result of the step-by-step forward feeding movement of the strip 12a of fastener blanks through the curving die mechanism 13 and the progressive curving of this strip of blanks into the tube 110, the completed ring fasteners 14 will emerge from the forward end of the outer die 79, as shown in Figs. 1 and 5. The tube of completed ring fasteners will move along and be supported by the rod extension 78b of the inner die 78 from which the completed ring fasteners can be removed individually or in groups, as may be desired.

Fig. 23 of the drawings shows a modified form of apparatus for producing the pronged ring fasteners 14 in two parallel groups. In this improved apparatus a curving die mechanism 136 is shown having a pair of outer die members 137 and 138 which are reciprocable in a side-by-side relation in a guidebox 139. This curving die mechanism is also provided with two axially extending inner die members or mandrels 140 and 141 disposed in the guidebox 139 and with which the outer die members 137 and 138 cooperate in the same manner and for the same purpose as the outer die 79 and the mandrel 78 of the curving die mechanism 13 described above.

The reciprocable outer die members 137 and 138 cooperate with their respective mandrels 140 and 141 in defining progressively converging die passages through which two strips of fastener blanks 142 and 143 are advanced in the same manner as described above for the strip of blanks 12a. The discharge ends of these die passages are defined by substantially cylindrical die tubes 144 and 145 mounted in the outer die members 137 and 138 and disposed in surrounding relation to stem extensions of the mandrels 140 and 141.

Reciprocating movement is imparted to the outer die members 137 and 138 by mechanism similar to the above described mechanism 18 and which includes a rockshaft 148 and levers 149 and 150 carried by the rockshaft and connected with the die members 137 and 138 by thrust links 151 and 152. The die members 137 and 138 are connected into a unitary assembly by connecting means which includes a pair of upper and lower splice plates 153 applied to the forward end portions of these die members.

The strips of blanks 142 and 143 are supplied to the curving die mechanism 136 by a shearing die mechanism 10 similar to that already described above. The two strips of blanks 142 and 143 are produced by the shearing die mechanism 10 by operation thereof on two parallel stock strips which are supplied thereto by a feed mechanism similar to the feed mechanism 15 above described. The two stock strips thus supplied can be individual strips withdrawn from separate rolls of stock material or can be a single wide strip of sheet metal stock which is split longitudinally by a suitable slitting device, such as a rotatable shearing disk cooperating with a backing roll (not shown), by which the single wide strip is split into two parallel individual stock strips during the feeding movement supplied by the feed mechanism 15.

With respect to the die tubes 144 and 145 of the curving die mechanism 136, it should be explained that these die tubes accomplish a shaping and sizing of the transversely curved strips 142 and 143 into tubes of completed fastener blanks similar to the function performed by the cooperating rolls 112 and 113 of the curving die mechanism 13. If desired, rolls similar to the rolls 112 and 113 could be used in the modified curving die mechanism 136 in place of the die tubes 144 and 145 and, conversely, a die tube similar to one of the die tubes 144 and 145 could be used in the curving die mechanism 13 in place of the cooperating rolls 112 and 113.

From the accompanying drawings and the foregoing detailed description it will now be readily understood that this invention provides novel apparatus by which pronged ring fasteners can be produced rapidly and economically and of a desired uniform characteristic from sheet metal in strip form.

Although the novel apparatus of the present invention has been illustrated and described herein to a somewhat detailed extent it will be understood, of course, that the invention is not to be regarded as being limited correspondingly in scope but includes all changes and modifications coming within the terms of the claims hereof.

Having thus described my invention, I claim:

1. In apparatus for producing ring-shaped articles from a strip of sheet metal stock, a support, a shearing die mechanism mounted on said support and comprising cooperating shearing die members operable to sever fastener blanks in succession from the leading end of the stock strip, guide means on said support and located relative to said shearing die mechanism to receive said blanks directly therefrom and comprising spaced-apart guide surfaces defining guide passage means extending in the direction of the axis of said stock strip and effective for maintaining said blanks in a series relation with the adjacent edges of adjacent blanks in abutting engagement so as to constitute a strip of said blanks, feeding means mounted on said support and associated with said shearing die mechanism and operable to intermittently advance said stock strip into said shearing die mechanism and to also intermittently advance said strip of blanks in the same direction and ahead of said stock strip by feeding movement transmitted through the latter, and a curling die mechanism mounted on said support and having a forming means reciprocably movable along said strip of blanks and operable on the latter by impingement thereagainst during the intervals when said strip of blanks is relatively stationary to curl said strip of blanks transversely thereof for forming said blanks into ring fasteners at substantially the same rate that said blanks are being produced by said shearing die mechanism, said guide passage means being defined at least in part by said curling die mechanism.

2. In apparatus for producing pronged ring fasteners from a strip of sheet metal stock, a support, a shearing die mechanism mounted on said support and comprising cooperating shearing die members operable to sever pronged fastener blanks in succession from the leading end of the stock strip including means for shearing the stock strip on an irregular transverse line corresponding with the prong profile of a plan development of the fastener, guide means located relative to said shearing die mechanism to receive said blanks directly therefrom and defining guide passage means extending in the direction of the axis of said stock strip and effective for maintaining said blanks in a series relation with the prongs of adjacent blanks in interfitting engagement so as to constitute a strip of said blanks, feeding means associated with said shearing die mechanism and operable to advance said stock strip and said strip of blanks with an intermittent movement, said feeding means being effective to push said stock strip into said shearing die mechanism and to also cause said intermittent advance movement of said strip of blanks by feeding movement transmitted to the latter through said stock strip, and other die mechanism mounted on said support to receive said strip of blanks directly from said guide means and having a forming means reciprocably movable along said strip of blanks and operable thereon by impingement to progressively impart a shaping force to said strip of blanks during the rest intervals between successive feeding movements for curling the strip of blanks transversely and forming said blanks into ring fasteners.

3. In apparatus for producing pronged ring fasteners from a strip of sheet metal stock, die mechanism operable to sever relatively narrow deeply serrated pronged fastener blanks in succession from the leading end of the stock strip including means for shearing the stock strip on an irregular transverse line at relatively closely spaced intervals and corresponding with the deeply serrated prong profile of a plan development of the fastener, means for maintaining said blanks in a transversely extending position in a longitudinal series with the prongs of adjacent blanks in interfitting engagement so as to constitute a strip of said blanks, feeding means operable to advance said stock strip and said strip of blanks with an intermittent movement, said feeding means being effective to push said stock strip into the first-mentioned die mechanism and to also cause said intermittent advance movement of said strip of blanks by feeding movement transmitted to the latter through said stock strip, and other die mechanism operable to progressively impart a shaping force to said strip of blanks during the rest intervals between successive feeding movements for curling the strip of blanks transversely and forming said blanks into ring fasteners, said other die mechanism comprising a tapered hollow die member reciprocably movable along said strip of blanks.

4. In apparatus for producing ring-shaped articles, a pair of die members having cooperating shearing edges adapted to sever relatively narrow blanks in succession from the leading end of a strip of sheet metal stock, means for maintaining said blanks in a transversely extending position in a longitudinal series with the adjacent edges of adjacent blanks in abutting engagement so as to constitute a strip of said blanks, a third die member having internal wall means defining a transversely concave channel recess tapering convergently from a relatively wide inlet opening at one end thereof to a substantially annularly closed delivery opening at the other end, means mounting said third die member for reciprocation axially of said channel recess with said inlet opening located to receive said strip of blanks, feeding means intermittently operable to supply said strip of stock to said pair of die members and to advance said strip of blanks through said channel recess, means for supporting said strip of blanks in said channel recess, and means adapted to produce said reciprocation of the third die member for causing said internal wall means thereof to wedgingly impinge said strip of blanks and progressively shape said blanks to ring form.

5. In apparatus for producing pronged ring fasteners of the character described, a pair of die members having cooperating relatively deeply serrated shearing edges adapted to sever relatively narrow deeply serrated pronged-edged fastener blanks in succession from the leading end of a strip of sheet metal stock, means for maintaining said blanks in a transversely extending position in a longitudinal series with the prongs of adjacent blanks in interfitting engagement so as to constitute a strip of said blanks, a third die member having internal wall means defining a transversely concave channel recess tapering convergently from a relatively wide inlet opening at one end thereof to a substantially annularly closed delivery opening at the other end, means mounting said third die member for reciprocation axially of said channel recess with said inlet opening located to receive said strip of blanks, feeding means intermittently operable to supply said strip of stock to said pair of die members and to advance said strip of blanks through said channel recess, means for supporting said strip of blanks in said channel recess, means operable to produce said reciprocation of the third die member for causing said internal wall means thereof wedgingly impinge said strip of blanks and progressively shape said blanks to annular contour, and cooperating die rolls defining a pass located to receive the contoured blanks from the channel recess of said third die member, said die rolls being effective on said contoured blanks to complete the shaping thereof to substantially closed ring form.

6. In apparatus for producing pronged ring fasteners of the character described, a pair of die members having cooperating relatively deeply serrated shearing edges adapted to sever relatively narrow deeply serrated pronged-edged fastener blanks in succession from the leading end of a strip of sheet metal stock, means for maintaining said blanks in a transversely extending position in a longitudinal series with the prongs of adjacent blanks in interfitting engagement so as to constitute a strip of said blanks, a third die member having internal wall means defining a transversely concave channel recess tapering convergently from a relatively wide inlet opening at one end thereof to a substantially annularly closed delivery opening at the other end, means mounting said third die member for reciprocation axially of said channel recess with said inlet opening located to receive said strip of blanks, feeding means intermittently operable to supply said strip of stock to said pair of die members and to intermittently advance said strip of blanks through said channel recess, means for supporting said strip of blanks in said channel recess, means intermittently operable to produce said reciprocation of the third die member for causing said internal wall means thereof to wedgingly impinge said strip of blanks during the intervals when the latter is relatively stationary and thereby progressively shape said blanks to annular contour, cooperating die rolls defining a pass located to receive the contoured blanks from the channel recess of said third die member, said die rolls being effective on said contoured blanks to complete the shaping thereof to substantially closed ring form, and means mounting said die rolls on said third die member for translatory movement during the reciprocation of the latter.

7. In apparatus for producing pronged ring fasteners of the character described, a pair of die members having cooperating relatively deeply serrated shearing edges adapted to sever relatively narrow deeply serrated pronged-edged fastener blanks in succesion from the leading end of a strip of sheet metal stock, means for maintaining said blanks in a transversely extending position in a longitudinal series with the prongs of adjacent blanks in interfitting engagement so as to constitute a strip of said blanks, a third die member having internal wall means defining a transversely concave channel recess tapering convergently from a relatively wide inlet opening at one end thereof to a substantially annularly closed delivery opening at the other end, means mounting said third die member for reciprocation axially of said channel recess with said inlet opening located to receive said strip of blanks from said pair of die members, feeding means operable to intermittently advance said strip of stock to said pair of die members and to also intermittently advance said strip of blanks through said channel recess with rest intervals between the advance movements, means for supporting said strip of blanks in said channel recess, means adapted to produce said reciprocation of the third die member for causing said internal wall means thereof to wedgingly impinge said strip of blanks during said rest intervals and progressively shape said blanks to ring form, and holding means effective on said strip of blanks during said rest intervals for holding said blanks against backward movement.

8. In apparatus for producing pronged ring fasteners of the character described, a pair of die members having cooperating serrated shearing edges adapted to shear transversely extending prong-edged fastener blanks in succession from the leading end of a strip of sheet metal stock and to leave said blanks in a series relation with the prongs of adjacent blanks in meshed engagement to constitute a strip of blanks, a second pair of die members comprising a pair of tapered coaxially nested relatively reciprocable cooperating convex and concave die members defining therebetween a transversely concave work channel of a cross-sectional shape varying progressively from a relatively wide inlet opening at one end thereof to a substantially annularly closed delivery opening at the other end, means mounting said second pair of die members with said inlet opening located to receive said strip of blanks from the first pair of die members, feeding means intermittently operable to supply the strip stock to said first pair of die members and to advance said strip of blanks through said work channel, and means operable to produce the relative reciprocation of said second pair of die members for causing the same to progressively shape said blanks therebetween to ring form during their movement through said work channel.

9. In apparatus for producing pronged ring fasteners of the character described, a support, a first pair of die members having cooperating serrated shearing edges adapted to sever transversely extending prong-edged fastener blanks in succession from the leading end of a strip of sheet metal stock and comprising a lower stake die member and an upper punch die member reciprocable relative thereto, means for actuating said punch die member, means on said support defining a guideway, a second pair of die members comprising tapered coaxially nested cooperating convex and concave inner and outer die members defining therebetween a transversely concave work channel varying progressively in cross-sectional shape from a relatively wide inlet opening at one end to a substantially annularly closed delivery opening at its other end, said second pair of die members being disposed in said guideway with said inlet opening located to receive said blanks from the first pair of die members, feeding means intermittently operable to supply the strip stock to the first pair of die members and to cause a series of said blanks to move through said work channel from said inlet opening to said outlet opening, means mounting said inner die member in substantially fixed relation on said support, said outer die member being reciprocable in said guideway for opening and closing movements relative to said inner die member for progressively bending said blanks around the latter, and means operable to cause the reciprocation of said outer die member.

10. In apparatus for producing pronged ring fasteners of the character described, a support, a first pair of die members having cooperating serrated shearing edges adapted to sever transversely extending prong-edged fastener blanks in succession from the leading end of a strip of sheet metal stock and comprising a lower stake die member and an upper punch die member reciprocable relative thereto, means for actuating said punch die member, means on said support defining a guideway, a second pair of die members comprising tapered coaxially nested cooperating convex and concave inner and outer die members defining therebetween a transversely concave work channel varying progressively in cross-sectional shape from a relatively wide inlet opening at one end to a substantially annularly closed delivery opening at its other end, said second pair of die members being disposed in said guideway with said inlet opening located to receive said blanks from the first pair of die members, feeding means intermittently operable to supply the strip stock to the first pair of die members and to cause a series of said blanks to move through said work channel from said inlet opening to said outlet opening, means mounting said inner die member in substantially fixed relation on said support, said outer die member being reciprocable in said guideway for opening and closing movements relative to said inner die member for progressively bending said blanks around the latter, means operable to cause the reciprocation of said outer die member, and a pair of cooperating die rolls connected with said outer die member for movement therewith and located adjacent said outlet opening, said die rolls being effective on said blanks to complete the transverse bending thereof to substantially ring form.

11. In apparatus for forming edge-abutting blanks into ring-shaped articles, a die member having internal wall means defining a transversely concave longitudinal die passage tapering convergently from a relatively wide inlet opening at one end thereof to a substantially annularly closed delivery opening at the other end thereof, means for supporting a series of said blanks in said die passage with the individual blanks in transversely extending relation to the axis of said die passage and with the blanks of the series confined in a substantially co-planar relation, means for causing said series to traverse said die passage from said inlet opening to said delivery opening with intermittent forward movement, means mounting said die member for reciprocating movements axially of said series, and means adapted to produce said reciprocating movements for causing said internal wall means to impinge against said blanks during the intervals when said series is relatively stationary to thereby progressively shape the blanks to ring form.

12. In apparatus for forming prong-edged blanks into pronged ring fasteners, a die member having internal wall means defining a transversely concave longitudinal die passage tapering convergently from a relatively wide inlet opening at one end thereof to a substantially annularly closed delivery opening at the other end thereof, means for supporting a series of said blanks in said die passage with the individual blanks in transversely extending relation to the axis of said die passage, means for causing said series to traverse said die passage from said inlet opening to said delivery opening with an intermittent forward movement and substantially preventing backward movement of said blanks during the rest intervals between the intermittent forward movements, means mounting said die member for reciprocating movements axially of said series, and means adapted to produce said reciprocating movements in timed relation to said intermittent forward movement for causing said internal wall means to impinge against said blanks during said rest intervals and progressively shape the blanks to ring form.

13. In apparatus for forming prong-edged blanks into pronged ring fasteners, a die member having internal wall means defining a transversely concave longitudinal die passage tapering convergently from a relatively wide inlet opening at one end thereof to a substantially annularly closed delivery opening at the other end thereof, means for supplying a strip comprising a series of said blanks in transversely extending relation with adjacent blanks having their prongs in interfitting engagement and causing said strip to move through said die passage from said inlet opening to said delivery opening with intermittent forward movement, means for supporting said strip in said die passage with the blanks of the strip confined in a substantially co-planar relation, means mounting said die member for reciprocating movements longitudinally of said strip, means for preventing backward movement of said strip, and means adapted to produce said reciprocating movements for causing said internal wall means to impinge against and deflect side portions of said strip during the intervals when said strip is relatively stationary to thereby progressively shape said blanks to ring form.

14. In apparatus for forming prong-edged blanks into pronged ring fasteners, a die member having internal wall means defining a transversely concave longitudinal die passage tapering convergently from a relatively wide inlet opening at one end thereof to a substantially annularly closed delivery opening at the other end thereof, means for supplying a strip comprising a series of said blanks in transversely extending relation with adjacent blanks having their prongs in interfitting engagement and causing said strip to move through said die passage from said inlet opening to said delivery opening with intermittent forward movement, means for supporting said strip in said die passage with the blanks of the strip confined in a substantially co-planar relation, means mounting said die member for reciprocating movements longitudinally of said strip, and means adapted to produce said reciprocating movements for causing said internal wall means to impinge against and deflect side portions of said strip during the intervals when said strip is relatively stationary to thereby progressively shape said blanks to ring form, the taper angle of said internal wall means having a relation to the thickness of the sheet metal of said blanks such that the prongs of adjacent blanks of said strip will remain in said interfitting engagement during the progressive shaping of the blanks to ring form.

15. In apparatus for forming prong-edged blanks into pronged ring fasteners, a die member having internal wall means defining a transversely concave longitudinal die passage tapering convergently from a relatively wide inlet opening at one end thereof to a substantially annularly closed delivery opening at the other end thereof, means for supplying a strip comprising a series of said blanks in transversely extending relation with adjacent blanks having their prongs in interfitting engagement and causing said strip to move through said die passage from said inlet opening to said delivery opening with an intermittent forward movement and substantially preventing backward movement of said strip during the rest intervals between the intermittent forward movements, means for supporting said strip in said die passage, means mounting said die member for reciprocating work-stroke and retracting movements longitudinally of said strip, and means for producing said reciprocating movements in timed relation to said intermittent forward movement such that said work-stroke movements cause impingement of said internal wall means against the sides of said strip during said rest intervals for progressively shaping said blanks to ring form and said retracting movements take place during said forward movements of the strip.

16. Apparatus for forming sheet metal blanks into ring-shaped articles comprising, an outer die member having a convergently tapered die passage therein, a convergently tapered mandrel disposed in said die passage in substantially coaxial relation thereto, said outer die member and said mandrel defining therebetween a transversely concave work space of progressively varying cross-sectional shape adapted to be traversed by a series of said blanks and including a substantially tubular delivery portion, means for causing said series of blanks to traverse said work space in a direction toward said tubular delivery portion with intermittent forward movement, said blanks being confined in said work space in a substantially co-planar relation, means supporting said outer die member for reciprocation longitudinally of said die passage, and means for producing reciprocation of said outer die member to cause the same to impinge and shape said blanks around said mandrel during the intervals when said series is relatively stationary.

17. Apparatus for forming prong-edged blanks into pronged ring fasteners comprising, an outer die member having a convergently tapered die passage therein, a convergently tapered mandrel die member disposed in said die passage in substantially coaxial relation thereto, said outer die member and said mandrel die member defining therebetween a transversely concave work space of progressively varying cross-sectional shape adapted to be traversed by a series of said blanks in transversely extending relation for the progressive bending of said blanks to substantially ring shape and including a delivery opening, means mounting said die members such that one die member is reciprocably movable relative to the other and axially of said passage for causing said progressive bending of the blanks, means for causing said blanks to be advanced intermittently in said work space and to be discharged through said delivery opening, said blanks being confined in said work space in a substantially co-planar relation, and means operable to produce the reciprocable movement of said one die member, a pair of cooperating grooved die rolls located substantially at said delivery opening for the passage of the ring shaped blanks therebetween, and means connecting said die rolls with said one die member for movement therewith.

18. Apparatus for forming prong-edged blanks into pronged ring fasteners comprising, an outer die member having a convergently tapered channel recess therein, a convergently tapered mandrel disposed in said recess in substantially coaxial relation thereto, said outer die member and said mandrel defining therebetween a transversely concave work space of progressively varying cross-sectional shape adapted to be traversed by a series of said blanks in transversely extending relation for the progressive bending of said blanks to substantially ring shape and including a substantially tubular delivery portion, means for causing said series to traverse said work space in a direction toward said tubular delivery portion and with intermittent forward movement, means mounting said outer die member for reciprocation relative to said mandrel and along said channel recess for causing said progressive bending of said blanks during the intervals when said series is relatively stationary, said blanks being confined in said work space in a substantially co-planar relation, and means for producing said reciprocation of said outer die member, said mandrel having a stem portion extending substantially coaxially in said tubular delivery portion.

19. Apparatus as defined in claim 18 in which said stem portion of the mandrel projects from said tubular delivery portion and forms a support for the completed pronged ring fasteners.

20. In apparatus for forming sheet metal blanks into ring-shaped articles, a support having a longitudinal guideway therein, a pair of tapered coaxially nested cooperating inner and outer convex and concave die members extending longitudinally in said guideway and defining therebetween a transversely concave work channel varying progressively in cross-sectional shape from a relatively wide inlet opening at one end to a substantially annularly closed delivery opening at its other end, means operable to cause a strip of said blanks in transversely extending edge-abutting relation to advance through said work channel from said inlet opening to said delivery opening with an intermittent forward movement, means mounting said inner die member in substantially fixed relation on said support, the blanks of said strip being confined in said work channel in a substantially co-planar relation, said outer die member being reciprocable in said guideway and along said work channel for opening and closing movements relative to said inner die member for progressively bending longitudinal edge portions of said strip around said inner die member during the intervals when said strip is relatively stationary to convert said blanks into pronged ring fasteners, and means operable to cause such reciprocation of said outer die member.

21. In apparatus for forming sheet metal blanks into ring-shaped articles, a bed, a hollow die box on said bed and having walls defining a guideway, an outer die member having a transversely concave longitudinal recess therein tapering convergingly to a substantially annularly closed delivery opening at one end thereof, a convergently tapered mandrel extending longitudinally in said recess, means connecting said mandrel with said die box for mounting the mandrel in said recess, said outer die member and mandrel being spaced apart and defining therebetween a transversely concave work space of progressively varying cross-sectional shape leading to said delivery opening and adapted to be traversed by said blanks for the progressive bending thereof to substantially ring shape, means for intermittently advancing said blanks in said work space, said outer die member being reciprocable in said guideway and along said recess so as to have successive closing movements relative to said mandrel for impinging and shaping said blanks around the latter during the intervals when said blanks are relatively stationary, and means for producing said closing movements of said outer die member.

22. In apparatus for producing prong-edged fastener blanks from a strip of sheet metal stock, a pair of punch and stake die members having cooperating deeply serrated shearing edges adapted to sever transversely extending prong-edged blanks in succession from the leading end of said strip such that during each such shearing operation one row of prongs is formed on the fastener blank being severed from the strip and another row of prongs is left on the leading end of the strip for the next succeeding blank, means for actuating said punch die member for producing the shearing cooperation with said stake die member, the prong-forming serrations of said punch die member having depending portions at the apices thereof for deflecting the ends of the prongs of the blank being severed out of the plane of such blank, and a row of depending lugs on said punch die member located to engage the previously formed prongs of said strip and deflect the ends thereof out of the plane of the strip during said shearing operation.

References Cited in the file of this patent

UNITED STATES PATENTS

| | | |
|---|---|---|
| 224,382 | Blake | Feb. 10, 1880 |
| 639,513 | Bristol | Dec. 19, 1899 |
| 1,290,555 | Heppes | Jan. 7, 1919 |
| 2,148,248 | Swangren | Feb. 21, 1939 |
| 2,222,842 | Humphrey | Nov. 26, 1940 |
| 2,267,873 | Place | Dec. 30, 1941 |
| 2,444,463 | Nordquist | July 6, 1948 |

FOREIGN PATENTS

| | | |
|---|---|---|
| 20,907 | Great Britain | Dec. 23, 1890 |